(12) United States Patent
Youn et al.

(10) Patent No.: US 10,437,465 B2
(45) Date of Patent: Oct. 8, 2019

(54) VEHICLE AND CONTROL METHOD OF THE SAME

(71) Applicant: HYUNDAI MOTOR COMPANY, Seoul (KR)

(72) Inventors: Seok-Young Youn, Seoul (KR); Kye Yoon Kim, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 178 days.

(21) Appl. No.: 15/377,317

(22) Filed: Dec. 13, 2016

(65) Prior Publication Data

US 2017/0308181 A1    Oct. 26, 2017

(30) Foreign Application Priority Data

Apr. 21, 2016 (KR) .................. 10-2016-0048864

(51) Int. Cl.
| | | |
|---|---|---|
| G06F 3/048 | (2013.01) | |
| G06F 3/0488 | (2013.01) | |
| B60K 35/00 | (2006.01) | |
| B60K 37/06 | (2006.01) | |

(52) U.S. Cl.
CPC .......... *G06F 3/04883* (2013.01); *B60K 35/00* (2013.01); *B60K 37/06* (2013.01); *G06F 3/04886* (2013.01); *B60K 2370/11* (2019.05); *B60K 2370/113* (2019.05); *B60K 2370/115* (2019.05); *B60K 2370/122* (2019.05); *B60K 2370/143* (2019.05); *B60K 2370/146* (2019.05); *B60K 2370/1438* (2019.05); *B60K 2370/1472* (2019.05); *G06F 2203/04806* (2013.01); *G06F 2203/04808* (2013.01); *G06F 2203/04809* (2013.01)

(58) Field of Classification Search
CPC ............... G06F 3/0237; G06F 3/04883; G06F 2203/04808; G06F 3/0488; G06F 3/0233; B60K 2350/1052
USPC ........................................ 715/773
See application file for complete search history.

(56) References Cited

U.S. PATENT DOCUMENTS

| | | | | |
|---|---|---|---|---|
| 2012/0242588 | A1* | 9/2012 | Myers | G06F 1/1637 345/173 |
| 2013/0113726 | A1 | 5/2013 | Tovar et al. | |
| 2014/0075388 | A1* | 3/2014 | Kuscher | G06F 3/0482 715/834 |
| 2014/0298264 | A1* | 10/2014 | Pearce | G06F 3/04883 715/834 |
| 2015/0248235 | A1* | 9/2015 | Offenberg | G06F 3/04886 715/773 |

FOREIGN PATENT DOCUMENTS

| | | |
|---|---|---|
| KR | 10-2011-0058312 A | 6/2011 |
| KR | 10-2016-0001180 A | 1/2016 |
| KR | 10-2016-0004770 A | 1/2016 |

* cited by examiner

*Primary Examiner* — Alex Olshannikov
(74) *Attorney, Agent, or Firm* — Morgan, Lewis & Bockius LLP

(57) ABSTRACT

A vehicle may include a display displaying a character input user interface to select at least one character among a selected character type; a touch input sensor detecting a touch; and a controller changing the selected character type based on a distance between two touch positions detected at the same time.

18 Claims, 19 Drawing Sheets

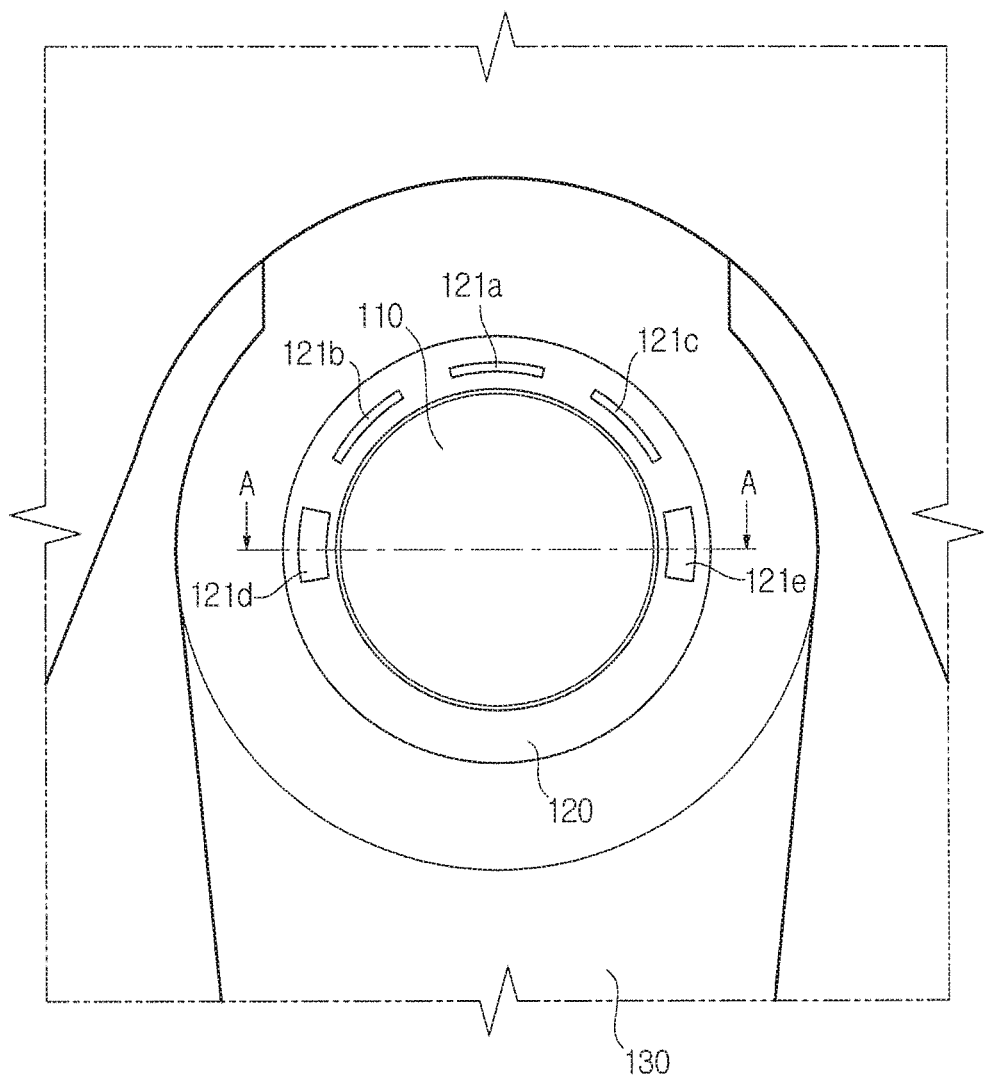

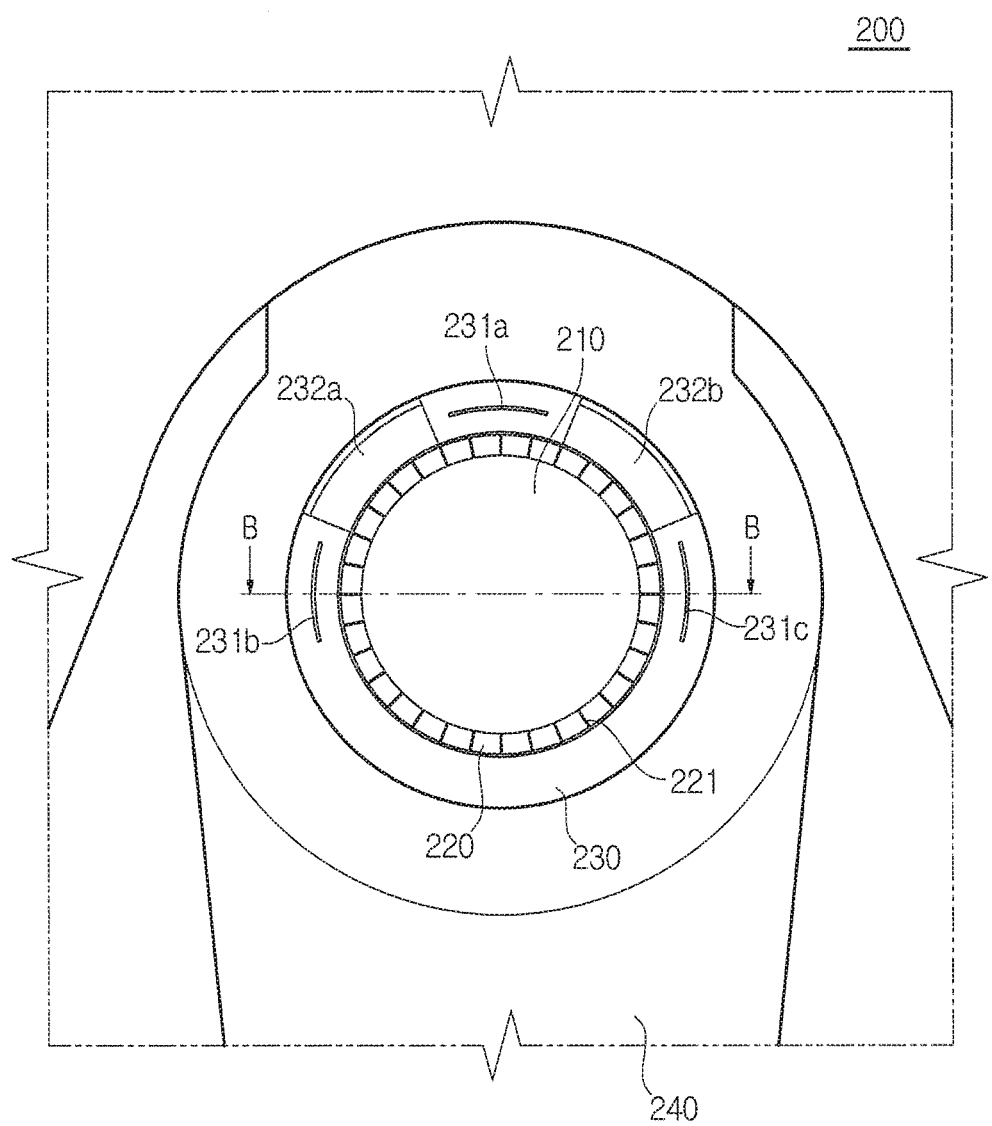

VEHICLE AND CONTROL METHOD OF THE SAME

CROSS-REFERENCE TO RELATED APPLICATION(S)

This application claims the benefit of priority to Korean Patent Application No. 10-2016-0048864, filed on Apr. 21, 2016 in the Korean Intellectual Property Office, the disclosure of which is incorporated herein by reference.

TECHNICAL FIELD

The present disclosure relates to a vehicle having a touch input sensor detecting a gesture, and a control method of the same.

BACKGROUND

A vehicle may be capable of providing a variety of functions for the convenience of a passenger as well as providing a basic driving function due to the development of the technology.

However, since the vehicle performs more various functions, driver's operation load related to the vehicle may be increased. The increase of the operation load may reduce the driver's concentration on the driving, and thus, it may interrupt safe driving. In addition, as the number of functions is increased, the difficulty in the operation may be increased, and thus a driver who is not used to operating the vehicle may not properly utilize functions provided from the vehicle.

To solve the above problem, studies have been actively conducted on a vehicle input device for reducing a driver's operation load and difficulty in operation. A representative of the vehicle input device may include a touch input sensor configured to detect a driver's touch. The driver may easily control the vehicle by touching the touch input sensor without complicated operations.

SUMMARY

An aspect of the present disclosure provides a vehicle capable of changing a character type in a character input user interface based on a distance between two touch positions simultaneously detected, and a control method of the same. Additional aspects of the present disclosure will be set forth in part in the description which follows and, in part, will be obvious from the description, or may be learned by practice of the present disclosure.

In accordance with an exemplary embodiment of one or more exemplary embodiments, a vehicle includes a display displaying a character input user interface to select at least one character among a selected character type; a touch input sensor detecting a touch; and a controller changing the selected character type based on a distance between two touch positions which are detected at the same time.

The display may display the character input user interface comprising a predetermined first region and a second region forming a plurality of layers in an edge of the first region, wherein the second region is configured such that each of the plurality of layers corresponds to a different character type.

In a state in which a first character type corresponding to a first sub region in the most inside among the plurality of layers is selected, when the distance between the two touch positions detected at the same time is reduced, the controller may select a second character type corresponding to a second sub region adjacent to the outside of the first sub region.

When the selected character type is changed from the first character type to the second character type, the display may display the first sub region by moving to the inside of the first region.

In a state in which the second character type is selected, when the distance between the two touch positions detected at the same time is increased, the controller may select the first character type corresponding to the first sub region placed inside of the first region.

When the selected character type is changed from the second character type to the first character type, the display may display the first sub region by moving the first sub region in the inside of the first region to between the outside of the first region and the second sub region.

In a state in which the second character type is selected, when the distance between the two touch positions detected at the same time is increased, the controller may select the first character type corresponding to the first sub region adjacent to the inside of the second sub region.

The display may display an area of a layer corresponding to the selected character type by increasing the area thereof.

The display may display the corresponding character type on each of the plurality of layers at the same time.

The touch input sensor may comprise a concave region configured to detect a touch.

In accordance with another exemplary embodiment of one or more exemplary embodiments, a control method of a vehicle includes: displaying, by a display, a character input user interface to select at least one character among a selected character type; detecting, by a touch input sensor, a touch; and changing, by a controller, the selected character type based on a distance between two touch positions which are detected at the same time.

The displaying the character input user interface may display the character input user interface comprising a predetermined first region and a second region forming a plurality of layers in an edge of the first region, wherein the second region is configured such that each of the plurality of layers corresponds to a different character type.

When a first character type corresponding to a first sub region in the most inside among the plurality of layers is selected, when the distance between the two touch positions detected at the same time is reduced, the changing the selected character type may select a second character type corresponding to a second sub region adjacent to the outside of the first sub region.

The displaying the character input user interface may further comprise displaying the first sub region by moving to the inside of the first region, when the selected character type is changed from the first character type to the second character type.

When the second character type is selected, when the distance between the two touch positions detected at the same time is increased, the changing the selected character type may select the first character type corresponding to the first sub region placed inside of the first region.

The displaying the character input user interface may further comprise displaying the first sub region by moving the first sub region the inside of the first region to between the outside of the first region and the second region, when the selected character type is changed from the second character type to the first character type.

When the second character type is selected, when the distance between the two touch positions detected at the same time is increased, the changing the selected character type may select the first character type corresponding to the first sub region adjacent to the inside of the second sub region.

The displaying the character input user interface face may display an area of a layer corresponding to the selected character type by increasing the area thereof.

The displaying the character input user interface face may display the corresponding character type on each of the plurality of layers at the same time.

The detecting a touch may detect the touch in a concave region provided in the touch input sensor of the vehicle.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 4A to 4C are views illustrating a touch input sensor in accordance with one embodiment of the present disclosure.

FIGS. 5A to 5C are views illustrating a touch input sensor in accordance with another embodiment of the present disclosure.

DETAILED DESCRIPTION

Reference will now be made in detail to embodiments of the present disclosure, examples of which are illustrated in the accompanying drawings.

Figure 1:
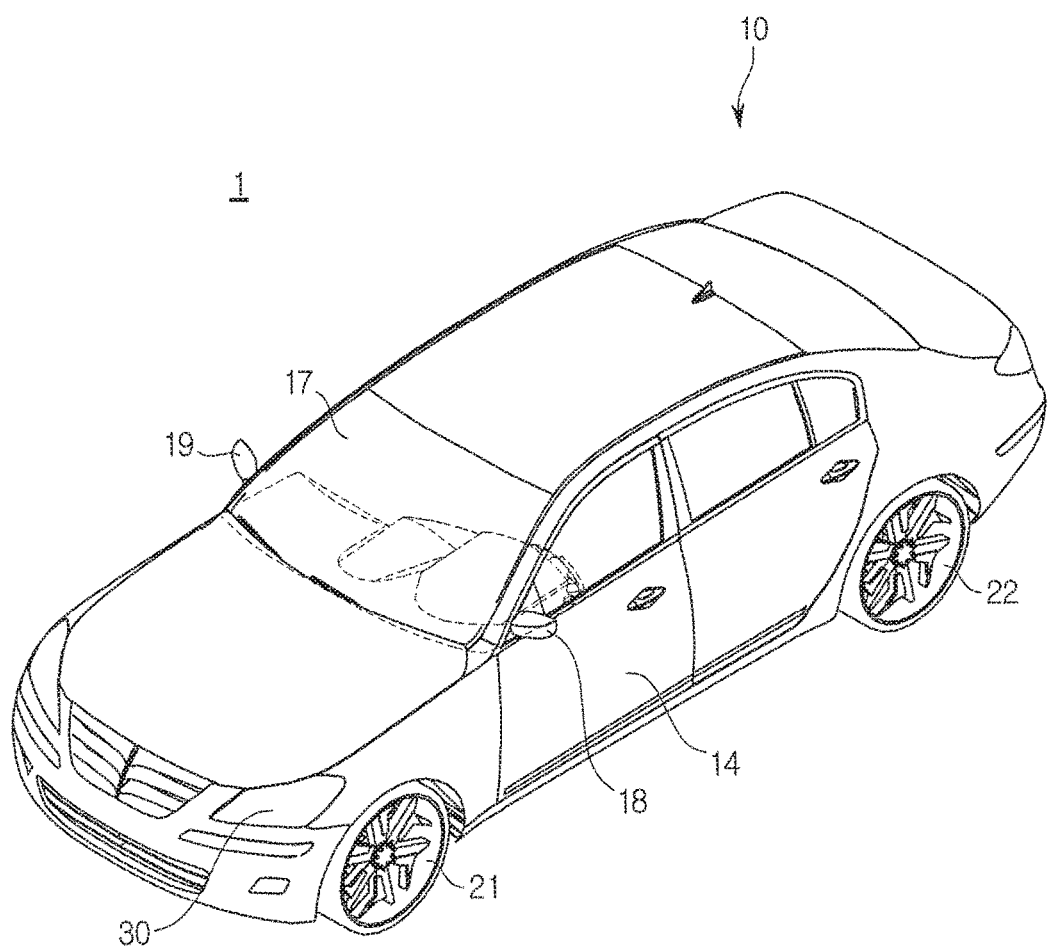
FIG. 1 is a view of an exterior of a vehicle in accordance with one embodiment of the present disclosure.

FIG. 1 is a view of an exterior of a vehicle in accordance with one embodiment of the present disclosure.

Referring to FIG. 1, the vehicle 1 may include a body 10 forming an exterior of the vehicle 1, vehicle wheels 21 and 22 moving the vehicle 1, a door 14 closing the inside of the vehicle 1 from the outside, a front glass 17 providing a front view of the vehicle 1 to a driver inside the vehicle 1, and side mirrors 18 and 19 providing a view of a rear side of the vehicle 1 to the driver.

The vehicle wheels 21 and 22 may include a front wheel 21 provided on a front of the vehicle 1 and a rear wheel 22 provided on a rear of the vehicle 1. The vehicle wheels 21 and 22 may move the vehicle 1 forward and backward by receiving a torque from a driving device 700 described later.

The door 14 may be rotatably provided on a right side and a left side of the body 10. When the door 14 is opened, a driver may be allowed to be seated in the vehicle 1, and when the door 14 is closed, the inside of the vehicle 1 may be closed from the outside.

The front glass 17 may be provided on an upper portion of the front of the vehicle 1 to allow a driver inside the vehicle 1 to acquire visual information about the front of the vehicle 1 and may be referred to as "windshield glass"

The side mirrors 18 and 19 may include a left side mirror 18 provided on the left side of the body 10 and a right side mirror 19 provided on the right side of the body 10. The side mirrors 18 and 19 may allow a driver inside the vehicle 1 to acquire visual information of the lateral side and the rear side of the vehicle 1.

Figure 2:
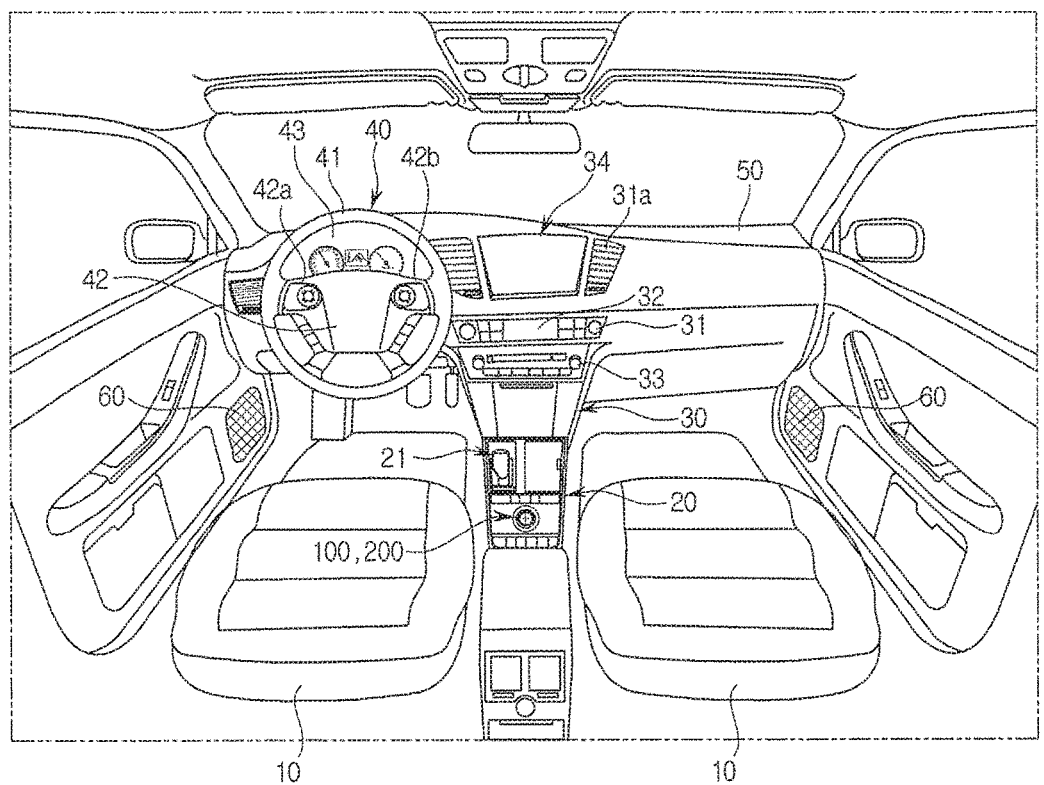
FIG. 2 is a view illustrating an inner configuration of the vehicle in accordance with one embodiment of the present disclosure.

FIG. 2 is a view illustrating an inner configuration of the vehicle in accordance with one embodiment of the present disclosure.

Referring to FIG. 2, the vehicle 1 may include a seat 10 in which a driver or a passenger is seated, and a dashboard 50 in which a gear box 20, a center fascia 30, and a steering wheel 40 are provided.

In the gear box 20, a gear lever 24 configured to change a speed of the vehicle 1, and a dial operation unit 22 configured to control an operation of functions of the vehicle 1 may be installed.

The steering wheel 40 provided in the dashboard 50 may adjust a driving direction of the vehicle 1, and may include a rim 41 held by the driver and a spoke 42 connected to a steering system of the vehicle 1 and configured to connect the rim 41 to a hub of a rotation shaft for the steering. According to the embodiment, manipulation devices 42a and 42b may be formed in the spoke 42 to control various devices inside the vehicle 1, such as an audio device.

A cluster 43 may display a speed gauge displaying a speed of the vehicle and RPM gauge displaying RPM of the vehicle. Therefore, a user may check information related to the vehicle with one glance. Particularly, the cluster 43 may display information related to the driving of the vehicle 1. For example, the cluster 43 may display a driving distance based on the amount of remaining fuel and navigation information and audio information.

In order for the driver to check information related to the vehicle without excessively escaping from the front side during driving, the cluster 43 may be provided on a region facing the steering wheel 40 among the region of the dashboard 50.

Although not shown in the drawings, a head up display (HUD) may be provided in the dashboard 50 so that visual information provided to the driver is displayed on the front glass 17.

An air conditioner 31, a clock 32, an audio 33, and a display 34 may be installed in the center fascia 30 provided in the dashboard 50.

The air conditioner 31 may keep an air inside the vehicle 1 in fresh by controlling a temperature, a moisture, an air cleanliness, and a flow of air of the inside of the vehicle 1. The air conditioner 31 may be installed in the center fascia 30 and may include at least one discharging port 31a discharging air. A button or a dial may be installed in the center fascia 30 to control the air conditioner 31. A passenger, e.g. a driver, may control the air conditioner 31 by using the button disposed on the center fascia 30.

The clock 32 may be provided adjacent to the button or the dial which are configured to control the air conditioner 31.

The audio 33 may include an operation panel in which a number of buttons are provided to perform functions of the audio 33. The audio 33 may provide a radio mode configure to provide a radio function, and a media mode configured to play an audio file of various storage media in which the audio file is stored.

The audio 33 may output an audio file as a sound by using a speaker 60. FIG. 2 illustrates that the speaker 60 is provided inside of the door but a position of the speaker 60 is not limited thereto.

The display 34 may display a variety of information directly or indirectly related to the vehicle. For example, the display may display the direction information, e.g., navigation information and condition information, and the indirect information, e.g., pictures provided from the inside or the outside of the vehicle and multi-media information including videos.

In addition, the display 34 may display a user interface to input characters, and a detail description thereof will be described later.

The display 34 may be implemented by liquid crystal display (LCD), light emitting diode (LED), plasma display panel (PDP), organic light emitting diode (OLED), and cathode ray tube (CRT), but is not limited thereto.

The dashboard 50 may further include a touch input sensors 100 and 200 configured to generate a control command by detecting a driver's touch. When the above mentioned user interface is displayed for inputting characters on the display, the driver may change the character types by using the touch input sensors 100 and 200.

Hereinafter, a vehicle easily changing the character types that are input by a driver during driving will be described in details.

Figure 3:
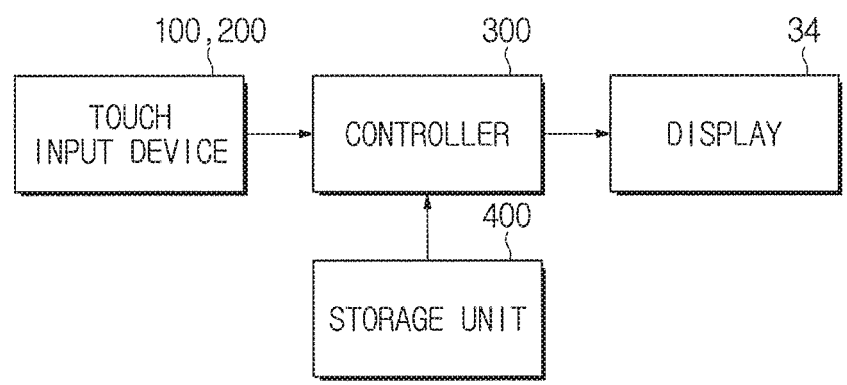
FIG. 3 is a control block diagram illustrating the vehicle in accordance with one embodiment of the present disclosure.

FIG. 3 is a control block diagram illustrating the vehicle in accordance with one embodiment of the present disclosure.

According to the embodiment, the vehicle may include the touch input sensors 100 and 200 detecting a touch including a gesture, a storage unit 400 in which a variety of information is pre-stored, the display 34 displaying a character input user interface to input characters based on a selected character and a controller 300 changing the selected character based on the detected touch.

A variety of information directly and indirectly related to the vehicle may be pre-stored in the storage unit 400. For example, the direction information, e.g., map information, navigation information of the vehicle and condition information of the vehicle, and the indirect information, e.g., multi-media information including pictures and videos provided from the inside or the outside of the vehicle may be pre-stored in the storage unit 400. As mentioned above, the information pre-stored in the storage unit 400 may be provided to the controller 300 and become the base of the control of the vehicle.

Here, the controller 300 may be an electronic control unit (ECU).

The touch input sensors 100 and 200 may detect a touch of a passenger including a driver. The touch input sensors 100 and 200 may be implemented by using well-known technology configured to detect a touch. For example, according to the embodiment, the touch input sensors 100 and 200 may have a concave region that is recessed to the inside thereof, wherein the concave region is configured to detect a touch.

Figure 4A:
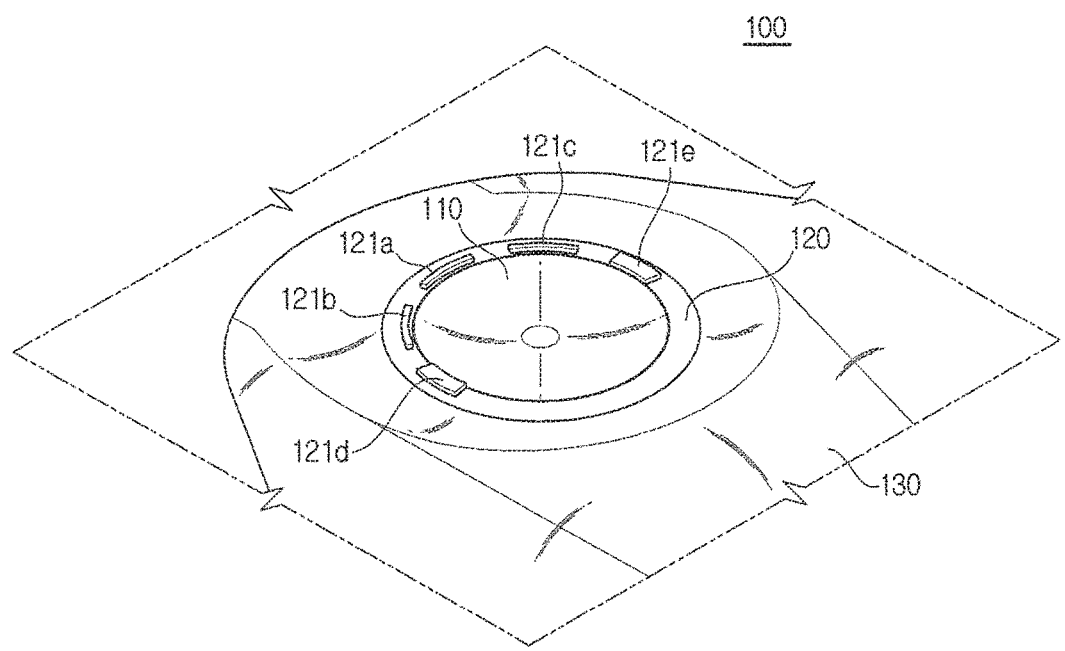
Figure 4C:
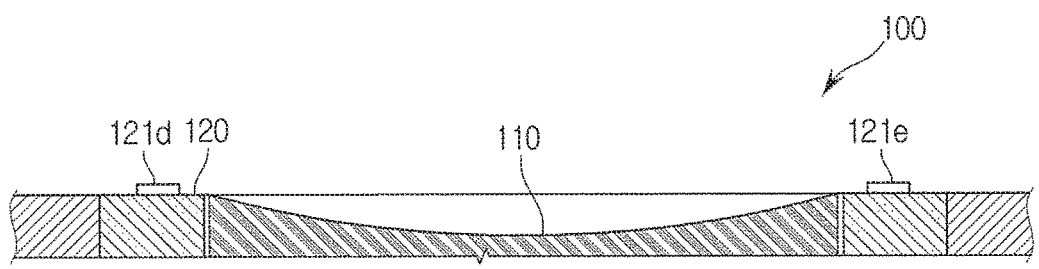
Figure 5A:
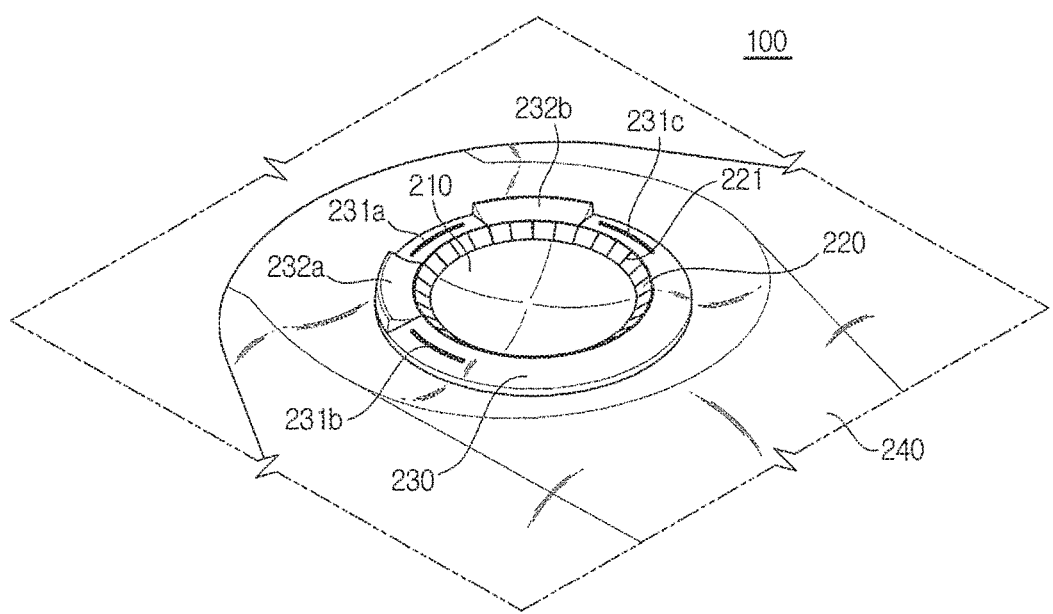
Figure 5C:
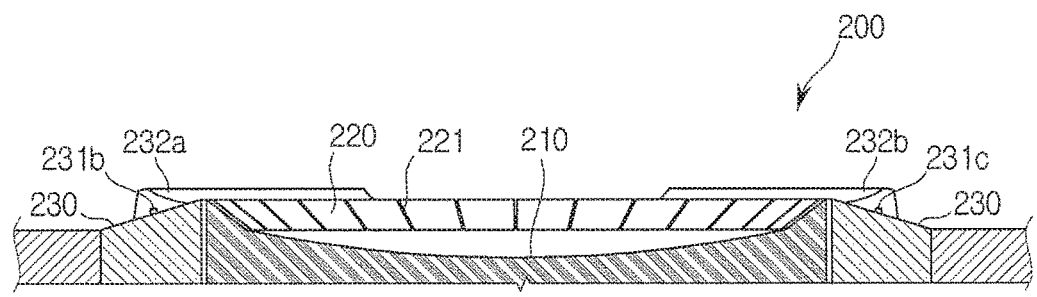

FIGS. 4A to 4C are views illustrating a touch input sensor in accordance with one embodiment of the present disclosure, and FIGS. 5A to 5C are views illustrating a touch input sensor in accordance with another embodiment of the present disclosure.

FIG. 4A is a perspective view of the touch input sensor in accordance with one embodiment, FIG. 4B is a plane view of the touch input sensor in accordance with one embodiment, and FIG. 4C is a cross-sectional view taken along line A-A' of the touch input sensor in accordance with one embodiment.

The touch input sensor shown in FIGS. 4A to 4C may include a touch unit 110 detecting a passenger's touch, and an edge unit 120 surrounding the touch unit 110.

The touch unit 110 may be a touch pad in which a signal is generated when a passenger touches or closes by using a pointer, e. g, a passenger's finger or a touch pen. The passenger may input a desired control command by inputting a pre-determined touch gesture to the touch unit 110.

Regardless of the name of touch pad, the touch pad may include a touch film, or a touch sheet including a touch sensor. The touch pad may include a touch panel, which is a display device provided with a touchable screen.

Recognizing a position of the pointer in a state in which the pointer is adjacent to the touch pad without touching the touch pad may be referred to as "proximity touch", and recognizing a position of the pointer in a state in which the pointer is touched on the touch pad may be referred to as "contract touch". A position where proximity touch occurs may be a position vertically corresponding to the pointer with respect to the touch pad when the pointer is close to the touch pad.

The touch pad may use resistive technology, optical technology, capacitive technology, ultrasound technology and pressure technology, but is not limited thereto. A well known technology may be used for the touch pad.

The edge unit 120 may represent a portion surrounding the touch unit 110, and may be provided by a member, which is separated from the touch unit 110. In the edge unit 120, key buttons or touch buttons 121 surrounding the touch unit 110 may be provided. That is, a passenger may input a control command to the touch unit 110 by using a touch, and may input a control command by using the buttons provided in the edge unit 120 in the surround of the touch unit 110.

According to the embodiment, the touch input sensor may further include a wrist supporting member 130 to support a passenger's wrist. At this time, the wrist supporting member 130 may be disposed to be higher than the touch unit 110. The wrist may be prevented from being bent when the passenger touches the touch unit 110 with the finger in a state of supporting the wrist supporting member 130. Accordingly, while preventing passenger's muscloskeletal disease, more comfortable sense of operation may be provided.

The touch unit 110 may include a lower portion than a boundary of the edge unit 120. That is, a touch area of the touch unit 110 may be provided to be lower than the boundary line between the touch unit 110 and the edge unit 120. For example, the touch area may be provided to be inclined downward from the boundary line of the edge unit 120 or to have a step from the boundary line of the edge unit 120. For example, the touch unit 110 according to the embodiment as illustrated in FIG. 4C may include a curved surface portion including a concave surface shape.

Since the touch area of the touch unit 110 includes a lower portion than the boundary line of the edge unit 120, the passenger may recognize the area and the boundary of the touch unit 110 by the tactility. As for the touch input sensor, a recognition rate of the touch may be increased in the center portion of the touch unit 110. In addition, when the passenger inputs a touch, the passenger may intuitively recognize the touch area and the boundary by the tactility and thus the passenger may input a touch to an accurate position, thereby improving the input accuracy of the touch.

The touch unit 110 may include a concave area. The concave shape may represent a dent or a recessed shape, and may include a dent shape to be inclined or to have a step as well as a dent shape to be circle.

Referring to FIG. 4C, the touch unit 110 may include a concave curved area. In this time, the curved surface of the touch unit 110 may be different from each other. For example, a curvature of the center may be small, i.e., the radius of curvature of the center may be large, and a curvature of the edge may be large, i.e., the radius of curvature of the edge may be small.

The touch unit 110 may include a curved surface, and thus when inputting a touch, a sense of touch or a sense of operation, which is felt by the passenger, may be improved. The curved surface of the touch unit 110 may be similar with a trajectory which is made by a movement of the end of the finger when a person moves the finger or rotates or twists a wrist with stretching the finger, in a state in which a person fixes her/his wrist.

The touch area of the touch unit 110 may be formed in a circular shape. When the touch unit 110 is provided in a circular shape, a concave surface may be easily formed. In addition, since the touch unit 110 is formed in a circular shape, a passenger may detect the touch area of the circular touch unit 110 by the tactility and thus the passenger may easily input a rolling or a spin gesture.

Since the touch unit 110 has a curved surface, a passenger may intuitively recognize which position of the touch unit 110 to be touched by a finger. The touch unit 110 may have a curved surface so that an inclination may vary according to a portion of the touch unit 110. Therefore, the passenger may intuitively recognize that a finger is placed in which position of the touch unit 110 by a sense of inclination, which is felt through the finger. Accordingly, when the passenger inputs a gesture to the touch unit 110 in a state in which the passenger stares at a point besides the touch unit 110, a feedback related to a position of the touch unit 110 where the finger is placed, may be provided to help the user to input a needed gesture, and may improve the input accuracy of gesture.

It is different from the above mentioned description, as for a touch input sensor according to an embodiment illustrated in FIGS. 5A to 5C, a concave area may be divided into a center and an edge.

FIG. 5A is a perspective view of a touch input sensor in accordance with another embodiment, FIG. 5B is a plane view of the touch input sensor in accordance with another embodiment, and FIG. 5C is a cross-sectional view taken along line B-B' of the touch input sensor in accordance with another embodiment.

The touch input sensor shown in FIGS. 5A to 5C may include a touch unit 210 and 220 detecting a passenger's touch, and an edge unit 230 surrounding the touch unit 210 and 220.

A method of detecting a touch by the touch unit is the same as the embodiment illustrated in FIGS. 4A to 4C.

The edge unit 230 may represent a portion surrounding the touch unit 210 and 220, and may be provided by a member, which is separated from the touch unit 210 and 220. In the edge unit 230, key buttons 232a and 232b or touch buttons 231a, 231b and 231c surrounding the touch unit 210 and 220 may be provided. That is, a passenger may input a gesture to the touch unit 210 and 220 and may input a signal by using the buttons 231 and 232 provided in the edge unit 230 in the surround of the touch unit 210 and 220.

As illustrated in FIGS. 4A to 4C, the touch input sensor 200 may further include a wrist supporting member 240 provided in a lower side of a gesture input means to support a passenger's wrist.

Referring to FIG. 5c, the touch unit 210 and 220 may include a lower portion than a boundary of the edge unit 230. That is, a touch area of the touch unit 210 and 220 may be provided to be lower than the boundary line between the touch unit 210 and 220, and the edge unit 230. For example, the touch area may be provided to be inclined downward from the boundary line of the edge unit 230 or to have a step from the boundary line of the edge unit 230. The touch unit 210 and 220 as illustrated in FIG. 5C may include a gesture input 210 including a concave surface shape.

A description in which the touch unit 210 and 220 includes a concave area is illustrated in FIGS. 5A to 5C.

The touch unit 210 and 220 according to a second embodiment may include a swiping input 220 inclined downward along an edge of the gesture input 210. When the touch unit 210 and 220 is provided in a circular shape, the gesture input 210 may have a shape of a part of spherical surface, and the swiping input 220 may be provided to surround a circumference of the gesture input 210.

The swiping input 220 may detect a swiping gesture. For example, a passenger may input a swiping gesture along the swiping input 220 provided in a circular shape. The passenger may input a swiping gesture along the swiping input 220 clockwise, or counterclockwise.

The swiping input 220 may include scales 221. The scale 221 may visually or tactually inform a relative position to a passenger. For example, the scale 221 may be provided to be engraved or embossed. Each of the scale 221 may be disposed by a certain distance. Therefore, the passenger may intuitively recognize the number of the scale 221 passed by the finger during a swiping, and thus the passenger may accurately adjust the distance of swiping gesture.

For example, a cursor displayed on the display 34 may be moved according to the number of the scale 221 passed by the finger during a swiping gesture. In a state in which various characters are consecutively disposed on the display 34, a selected character may be moved by a space to the next whenever the user passes a single scale 221 while performing the swiping gesture.

According to the embodiment illustrated in FIGS. 5A to 5C, the inclination of the swiping input 220 may be provided to have a larger inclination than a tangential inclination of the swiping input 220 in the boundary between the swiping input 220 and the gesture input 210. When a passenger inputs a gesture in the gesture input 210, the passenger may intuitively recognize the touch area of the gesture input 210 since the inclination of the swiping input 220 is larger than that of the gesture input 210. While a gesture is input to the gesture input 210, a touch of the swiping input 220 may be not recognized. Therefore, although the passenger reaches the boundary of the swiping input 220 during inputting the gesture to the gesture input 210, a gesture input to the gesture input 210 and a swiping gesture input to the swiping input 220 may be not overlapped.

The touch unit 210 and 220 may be provided in a way that the gesture input 210 and the swiping input 220 are integrally formed. The gesture input 210 and the swiping input 220 may include a respective touch sensor, or a single touch sensor. When the gesture input 210 and the swiping input 220 are provided with a single touch sensor, the controller may distinguish the touch area of the gesture input 210 from the touch area of the swiping input 220 and thus may distinguish a signal by a touch in the gesture input 210 and a touch in the swiping input 220.

The touch input sensor 200 may further include a button input tool 231 and 232. The touch input tool 231 and 232 may be disposed around the touch unit 210 and 220. The button input tool 231 and 232 may include a touch button 231*a* 231*b*, and 231*c* performing a pre-determined function by a passenger's touch, or a pressure button 232*a* and 232*b* performing a pre-determined function while a position is changed by an external force from a passenger.

Referring back to FIG. 3, the display 34 may display the character input user interface configured to select at least one character among a selected character type. Hereinafter, a method of inputting characters by using the character input user interface displayed on the display 34 and a method of changing the character type that can be input will be described in details.

Figure 6A:
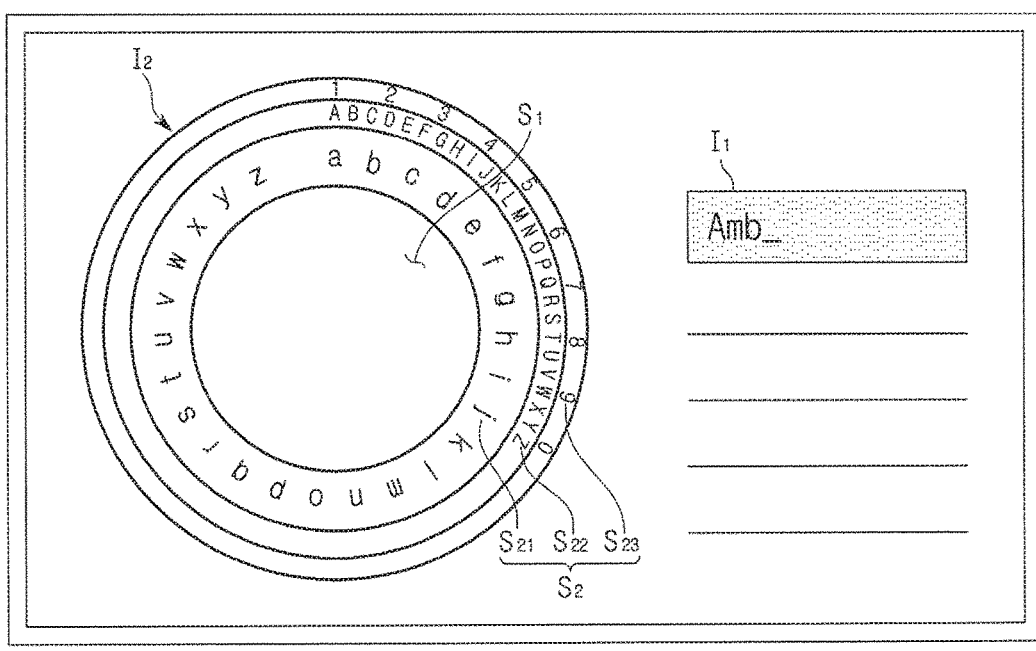
FIGS. 6A and 6B are views illustrating the character input user interface displayed by the display accordance with one embodiment of the present disclosure.
Figure 6B:
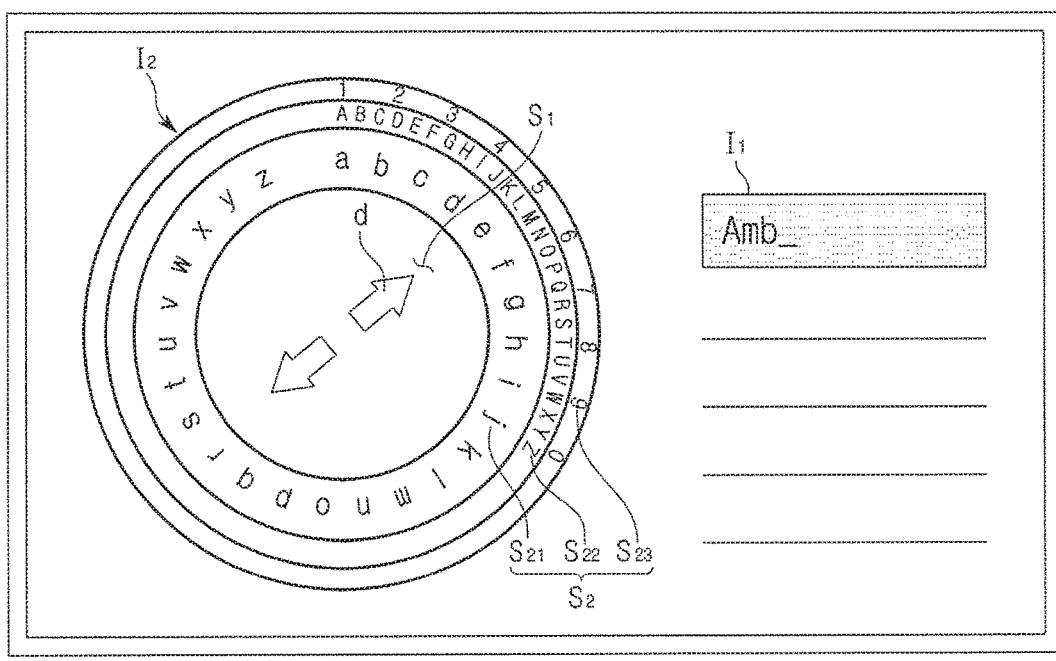
Figure 7A:
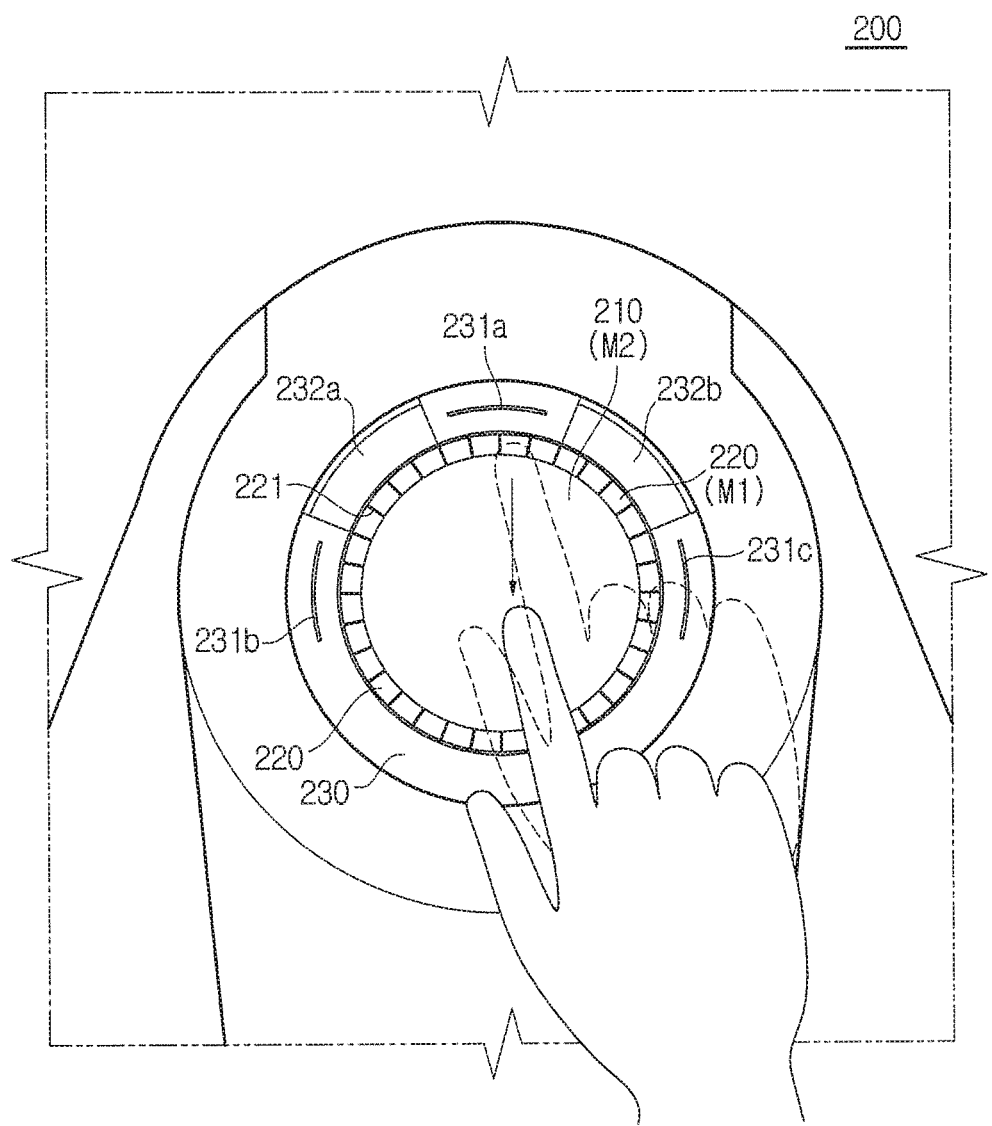
FIGS. 7A and 7B are views illustrating a method of inputting characters accordance with one embodiment of the present disclosure.
Figure 7B:
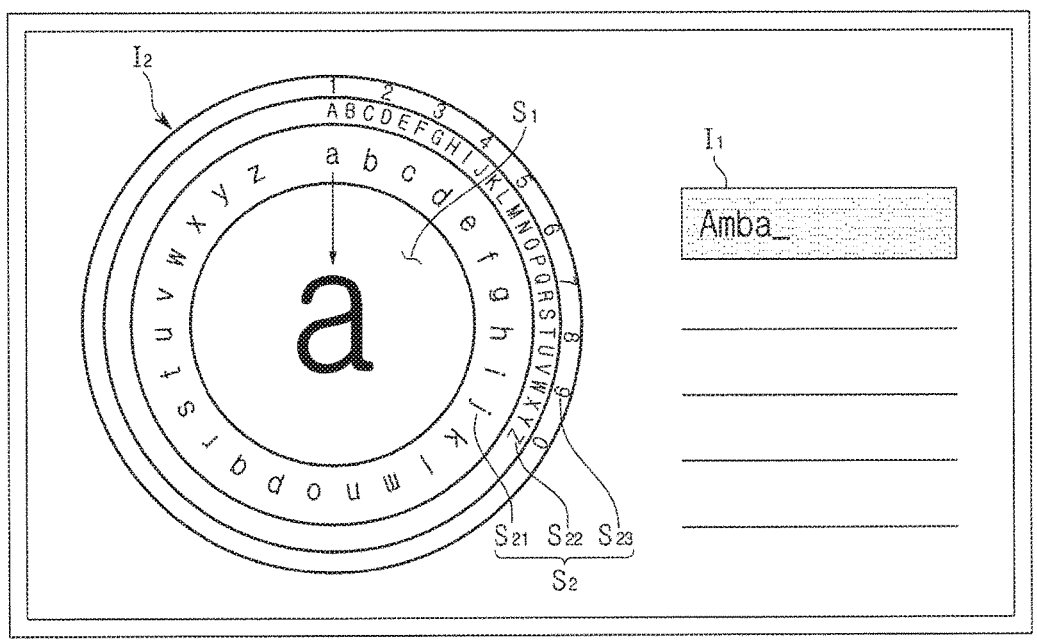

FIGS. 6A and 6B are views illustrating the character input user interface displayed by the display accordance with one embodiment of the present disclosure, and FIGS. 7A and 7B are views illustrating a method of inputting characters in accordance with one embodiment of the present disclosure.

Referring to FIG. 6A, the character input user interface displayed on the display 34 may include an input character display object (I1) in which a selected character is displayed and a character input object (I2) to receive a character.

The input character display object (I1) may display characters, which are input via the character input object (I2) described later, in a predetermined order. Referring to FIG. 6A, it may be confirmed that "Amb" is currently input by an input from a user.

The character input object (I2) may include a first region (S1) in which a character to be input is placed, in the center thereof and a second region (S2) forming a plurality of layers in an edge of the first region (S1). In this time, each layer of the second region (S2) may correspond to a different character type, and a layer corresponding to a selected character type may be displayed to have a wider area than other layer.

In FIG. 6A, a first sub region (S21) in the most inside among the plurality of layers is illustrated to correspond to alphabet small letters, a second sub region (S22) in the outside of the first sub region (S21) is illustrated to correspond to alphabet capital letters, and a third sub region (S23) in the most outside is illustrated to correspond to numbers. In addition, the first sub region (S21) may be illustrated to be wider than other sub regions, and thus it may be confirmed that alphabet small letter is currently selected as a character that can be input.

As illustrated in FIG. 6B, an arrow (d) in a circumferential direction may be further displayed inside of the first region (S1). The arrow (d) may be configured to guide a gesture for changing the character types, and a description thereof will be later.

A passenger may input a character by placing any one character among a character type that can be input, i.e., alphabet small letters, in the first region (S1). For example, a gesture input to the touch input sensors 100 and 200 may be displayed in the first region (S1), and the controller 300 may recognize that alphabet small letter corresponding to the gesture is input. As a result, the display 34 may display a recognized character on the input character display object (I1).

Alternatively, since a passenger moves any one of the plurality of alphabet small letters displayed on the first sub region (S21) to the first region (S1), the passenger may input the corresponding character. Particularly, the touch input sensors 100 and 200 may receive drag-and-drop gesture. Referring to FIG. 7A, a drag-and-drop gesture that is from a certain position in the swiping input 220 to the gesture input 210 may be input to the touch input sensors 100 and 200. As a result, as illustrated in FIG. 7B, the display 34 may move letter "a" corresponding to a position at a time of the above mentioned gesture, to the first region (S1) and thus the display 34 may add letter "a", which is input to the input character display object (I1), to the next to "Amb".

The character input user interface may change the character type that can be input, according to an input of a passenger. In a state in which a driver wants to input a desired character during driving, as it is easier to change the character type, a front-observing rate of the driver may be more improved. Accordingly, the driving stability may be increased. Therefore, it may be required to provide an environment in which the character types can be easily changed by inputting an initiative touch gesture corresponding to the character input user interface.

Figure 8A:
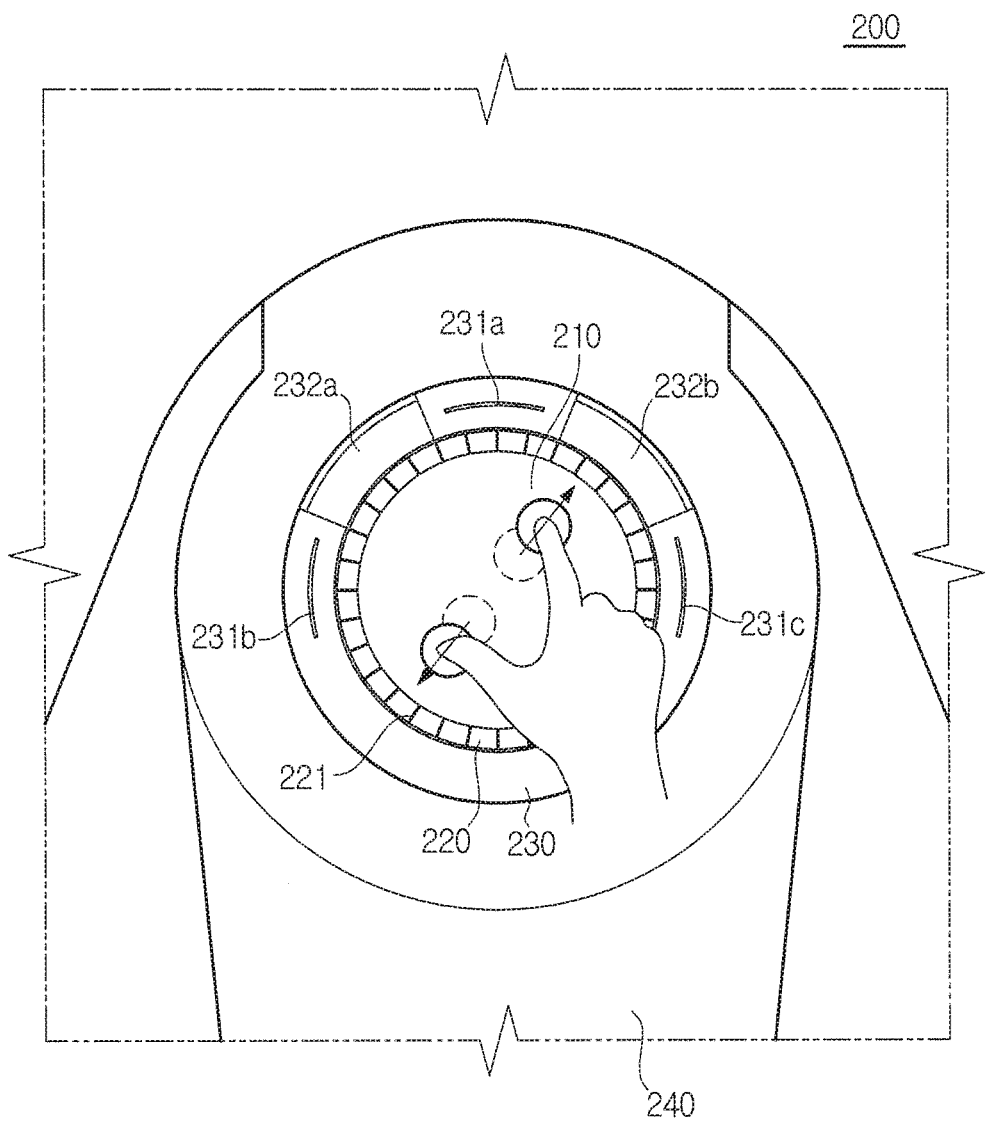
FIGS. 8A and 8B are views illustrating a touch for changing the character type detected by the touch input sensor in accordance with one embodiment of the present disclosure.
Figure 8B:
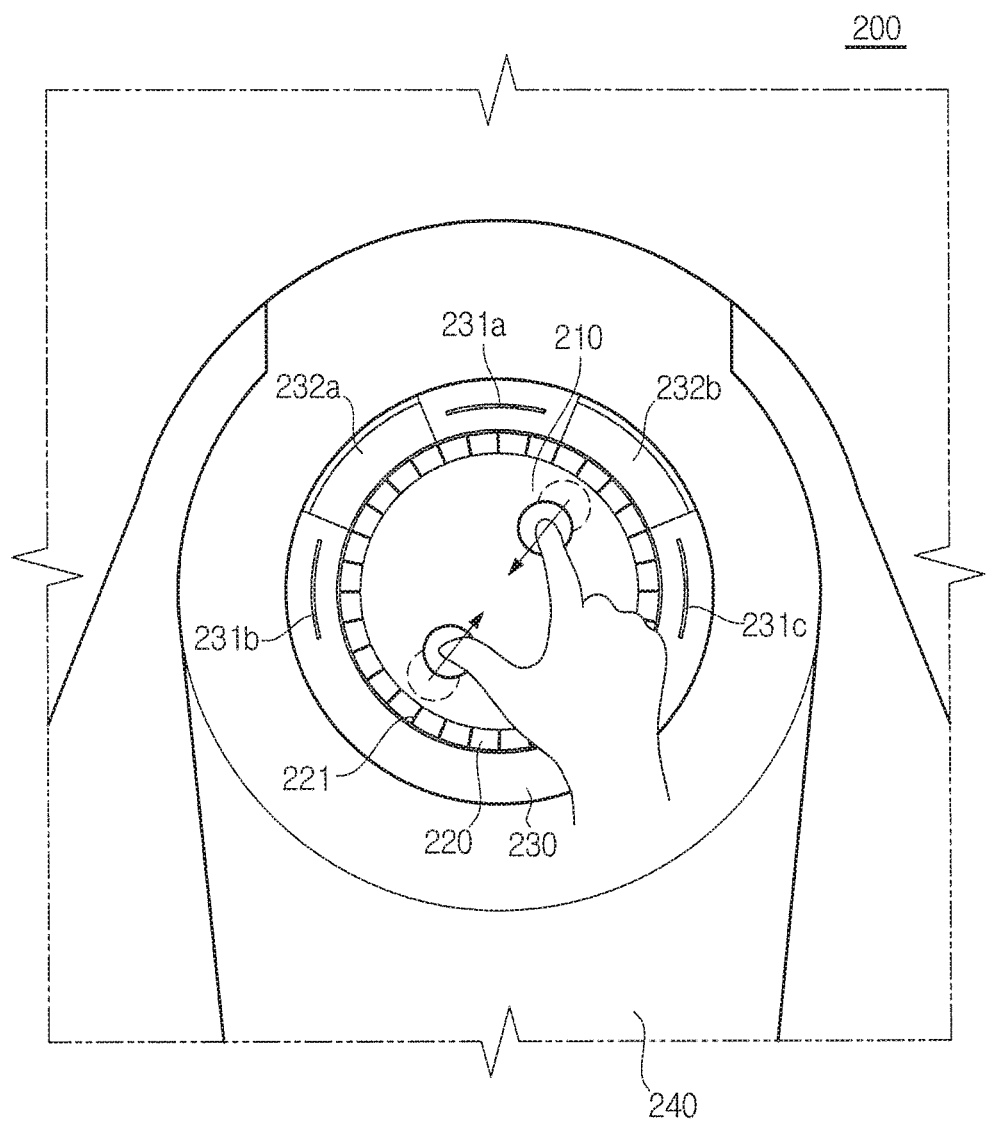

FIGS. 8A and 8B are views illustrating a touch for changing the character type detected by the touch input sensor in accordance with one embodiment of the present disclosure.

The touch input sensors 100 and 200 may detect two touches at the same time, and further detect a distance between the two touches. Therefore, the touch input sensors 100 and 200 may detect a change in the distance between the two touch positions that is detected at the same time, and the controller 300 may change the character type based on the change in the distance between the detected two touch positions.

Referring to FIG. 8A, the touch input sensors 100 and 200 may detect a gesture of increasing a distance between two touch positions that are detected at the same time. The gesture of increasing the distance between two touch positions may include "Pinch In".

The gesture shown in FIG. 8A may be intuitively recognized as a motion of exposing something placed in the inside to the outside and thus the second region (S2) of the character input user interface may be operated to change a selection from a currently selected layer to the more inner layer. To help this, as illustrated in FIG. 6B, the arrow (d) may be displayed inside of the first region (S1) and a direction of the arrow (d) may serve as a guide guiding a direction of gesture for changing the character type.

Referring to FIG. 8B, the touch input sensors 100 and 200 may detect a gesture of reducing a distance between two touch positions that are detected at the same time. The gesture of reducing the distance between two touch positions may include "Pinch Out".

The gesture shown in FIG. 8B may be intuitively recognized as a motion of moving something placed in the outside to the inside and thus the second region (S2) of the character input user interface may be operated to change a selection from a currently selected layer to the more outer layer.

In addition, according to the input of the gesture shown in FIGS. 8A and 8B, the controller 300 may change the character type, which can be input, into the character type corresponding to a changed layer.

Hereinafter, a variety of methods of changing the character type will be described with reference to FIGS. 9A to 9C.

Figure 9A:
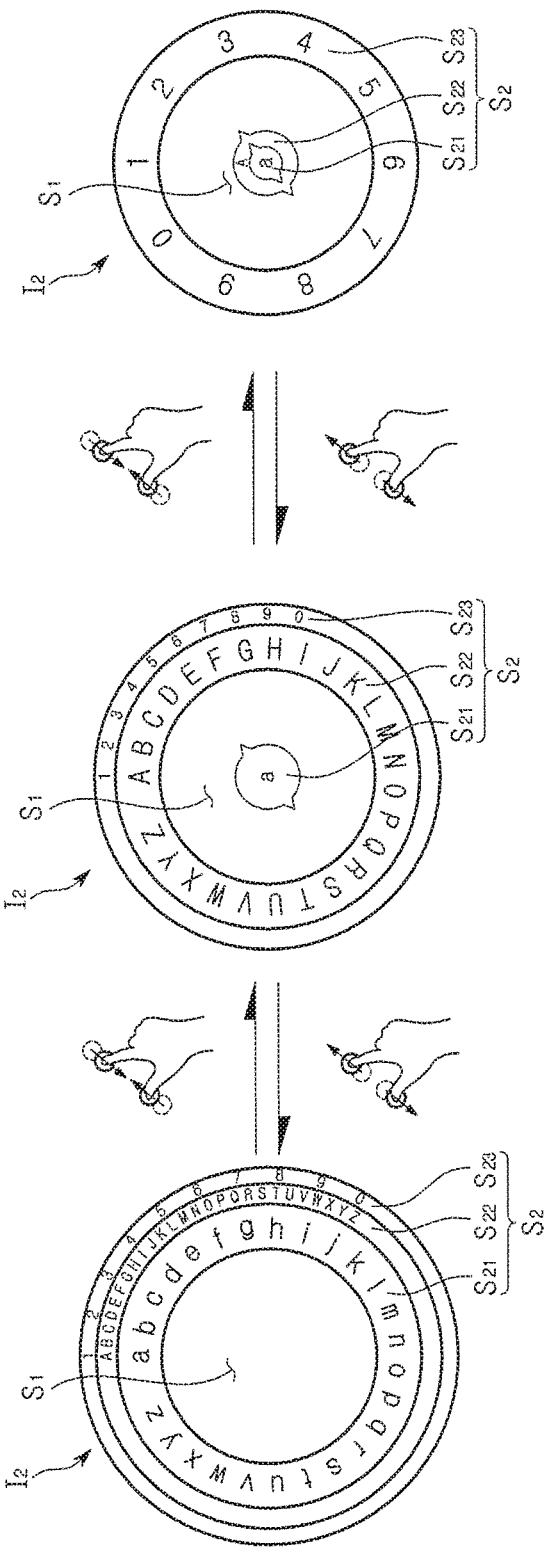
FIGS. 9A to 9C are views illustrating a variety of methods of changing the character type in accordance with a variety of embodiments of the present disclosure.
Figure 9B:
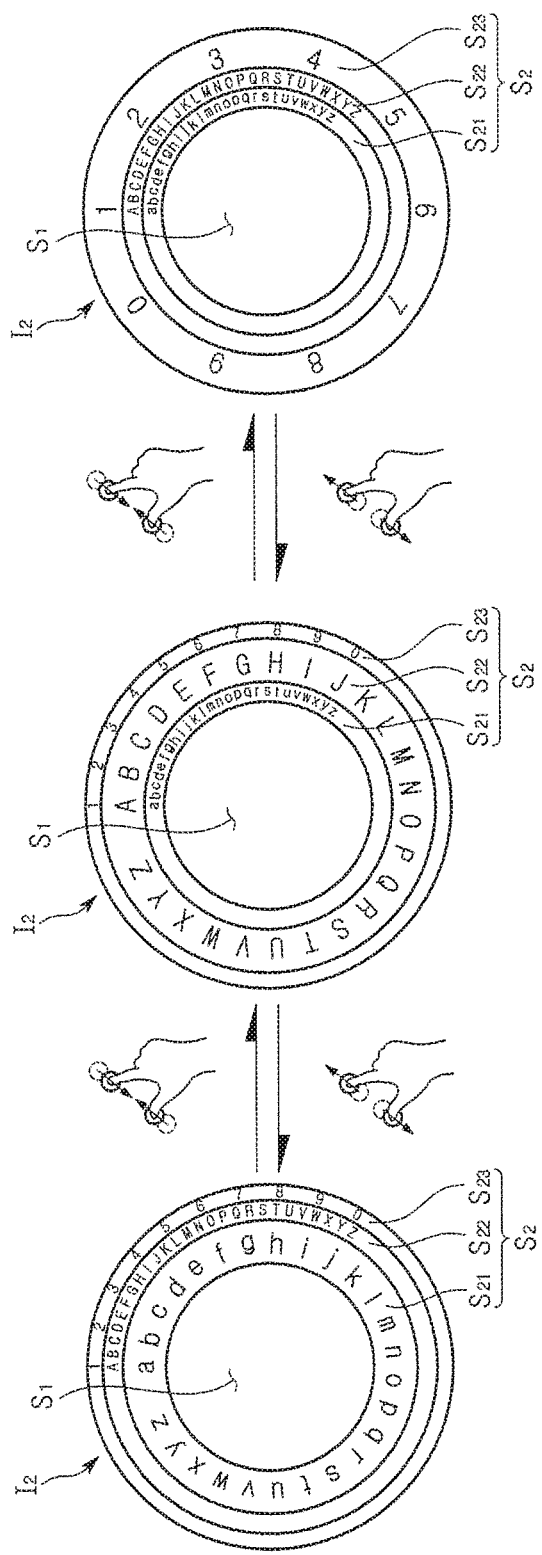
Figure 9C:
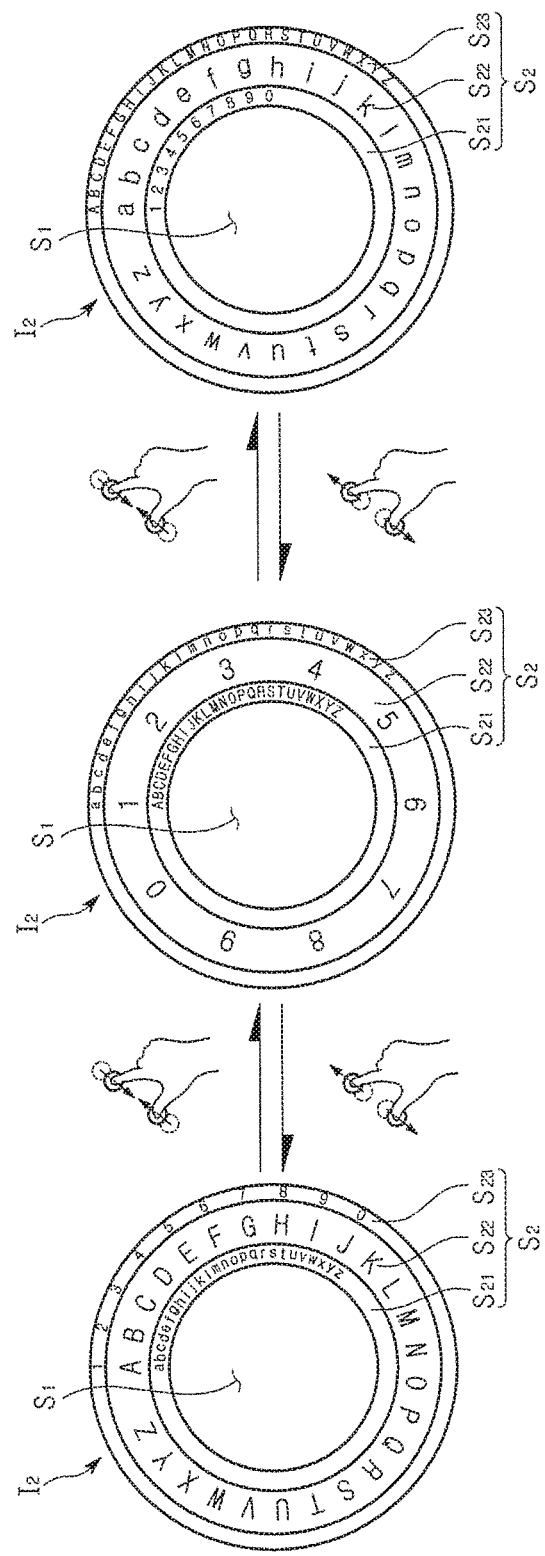

FIGS. 9A to 9C are views illustrating a variety of methods of changing the character type in accordance with a variety of embodiments of the present disclosure. Particularly, FIGS. 9A to 9C are views illustrating a relation between a character input object and an input gesture.

Referring to the left side of FIG. 9A, a character input object (I2) may include a first region (S1) formed in a circular shape and in which a character to be input is placed, and a second region (S2) configured with three layers in an edge of the first region (S1). Particularly, the second region (S2) may include a first sub region (S21) that is the most inner layer and corresponds to alphabet small letters, a second sub region (S22) that is a layer adjacent to the outside of the first sub region (S21) and corresponds to alphabet capital letters, and a third sub region (S23) that is a layer adjacent to the outside of the second sub region (S22) and corresponds to numbers. Further, since the first sub region (S21) is illustrated to be wider than other sub regions, the character input object (I2) in the left side may indicate that alphabet small letter corresponding to the first sub region (S21) is currently selected to be input.

When the touch input sensors 100 and 200 detects the pinch out gesture from a passenger, the controller 300 may select alphabet capital letters, which corresponds to the second sub region (S22) adjacent to the outside of the first sub region (S21), as the character type that can be input. As a result, referring to the center of FIG. 9A, as for the character input object (I2), an area of the second sub region (S22) may be increased and the first sub region (S21) may be changed into a circle or a shape similar to the circle and then moved to the center portion of the first region (S1). The passenger may visually recognize the change and thus the passenger may confirm that the character type that can be selected is changed from alphabet small letters to alphabet capital letters.

Once again, when the touch input sensors 100 and 200 detects the pinch out gesture from a passenger, the controller 300 may select numbers, which corresponds to the third sub region (S23) adjacent to the outside of the second sub region (S22), as the character type that can be input. As a result, referring to the right side of FIG. 9A, as for the character input object (I2), an area of the third sub region (S23) may be increased and the second sub region (S22) may be moved to the outside of the first sub region (S21) that is moved to the center portion of the first region (S1). The passenger may visually recognize the change and thus the passenger may confirm that the character type that can be selected is changed from alphabet capital letters to numbers.

When the touch input sensors 100 and 200 detects the pinch in gesture from a passenger, the controller 300 may select alphabet capital letters, which corresponds to the second sub region (S22) adjacent to the inside of the third sub region (S23), as the character type that can be input. As a result, referring to the center of FIG. 9A again, as for the character input object (I2), the area of the third sub region (S23) may be reduced and the second sub region (S22) may be moved between the outside of the first region (S1) and the inside of the third sub region (S23). The passenger may visually recognize the change and thus the passenger may confirm that the character type that can be selected is changed from numbers to alphabet capital letters.

At last, when the touch input sensors 100 and 200 detects the pinch in gesture from a passenger, again, the controller 300 may select alphabet small letters, which corresponds to the first sub region (S21) adjacent to the inside of the second sub region (S22), as the character type that can be input. As a result, referring to the left side of FIG. 9A again, as for the character input object (I2), the area of the second sub region (S22) may be reduced and the first sub region (S21) may be moved between the outside of the first region (S1) and the inside of the second sub region (S22). The passenger may visually recognize the change and thus the passenger may confirm that the character type that can be selected is changed from alphabet capital letters to alphabet small letters.

As mentioned above, since each of the plurality of layers in the outside of the first region (S1) corresponds to a different character type, it may be possible to intuitively change a layer that is selected by the pinch in gesture and/or the pinch out gesture.

Hereinbefore, a case in which a layer placed inside of a selected layer is moved to the center portion is described as an example, but alternatively, the plurality of layers may be fixed to the outside of the first region (S1).

According to the left side of FIG. 9B, the second region (S2) may include a first sub region (S21) that is the most inner layer and corresponds to alphabet small letters, a second sub region (S22) that is a layer adjacent to the outside of the first sub region (S21) and corresponds to alphabet capital letters, and a third sub region (S23) that is a layer adjacent to the outside of the second sub region (S22) and corresponds to numbers. A description thereof will be the same as FIG. 9A. The character input object (I2) in the left side of FIG. 9B may illustrate a state in which alphabet small letters corresponding to the first sub region (S21) is selected, and it may be the same as the left side of FIG. 9A.

When the touch input sensors 100 and 200 detects the pinch out gesture from a passenger, the controller 300 may select alphabet capital letters, which corresponds to the second sub region (S22) adjacent to the outside of the first sub region (S21), as the character type that can be input. As a result, referring to the center of FIG. 9B, as for the character input object (I2), an area of the second sub region (S22) may be increased. The increased area of the first sub region (S21) may be restored to a normal state. The passenger may visually recognize the change and thus the passenger may confirm that the character type that can be selected is changed from alphabet small letters to alphabet capital letters.

Once again, when the touch input sensors 100 and 200 detects the pinch out gesture from a passenger, the controller 300 may select numbers, which corresponds to the third sub region (S23) adjacent to the outside of the second sub region (S22), as the character type that can be input. As a result, referring to the right side of FIG. 9B, as for the character input object (I2), an area of the third sub region (S23) may be increased. The increased area of the second sub region (S22) may be restored to a normal state. The passenger may visually recognize the change and thus the passenger may confirm that the character type that can be selected is changed from alphabet capital letters to numbers.

When the touch input sensors 100 and 200 detects the pinch in gesture from a passenger, the controller 300 may select alphabet capital letters, which corresponds to the second sub region (S22) adjacent to the inside of the third sub region (S23), as the character type that can be input. As a result, referring to the center of FIG. 9B again, as for the character input object (I2), the area of the second sub region (S22) may be increased. The increased area of the third sub region (S23) may be restored to a normal state. The passenger may visually recognize the change and thus the passenger may confirm that the character type that can be selected is changed from numbers to alphabet capital letters.

At last, when the touch input sensors 100 and 200 detects the pinch in gesture from a passenger, the controller 300 may select alphabet small letters, which corresponds to the first sub region (S21) adjacent to the inside of the second sub region (S22), as the character type that can be input. As a result, referring to the left side of FIG. 9B again, as for the character input object (I2), an area of the first sub region (S21) may be increased. The increased area of the second sub region (S22) may be restored to a normal state. The passenger may visually recognize the change and thus the passenger may confirm that the character type that can be selected is changed from alphabet capital letters to alphabet small letters.

Alternatively, it is different from the above mentioned embodiment, although the plurality of layers is fixed to the outside of the first region (S1), the corresponding character type may be changed.

As illustrated in FIG. 9C, the character type corresponding to each layer may be changed according to a gesture detected by the touch input sensors 100 and 200. In this time, since the area of the second sub region (S22) is maintained to be large, a character type, which is selected as a character type that can be input, may be changed as a character type corresponding to the second sub region (S22) is changed.

According to the left side of FIG. 9C, the second region (S2) may include a first sub region (S21) that is the most inner layer and corresponds to alphabet small letters, a second sub region (S22) that is a layer adjacent to the outside of the first sub region (S21) and corresponds to alphabet capital letters, and a third sub region (S23) that is a layer adjacent to the outside of the second sub region (S22) and corresponds to numbers. A description thereof will be the same as FIGS. 9A and 9B. However, the character input object (I2) in the left side of FIG. 9C may illustrate a state in which alphabet capital letters corresponding to the second sub region (S22) is selected.

When the touch input sensors 100 and 200 detects the pinch out gesture from a passenger, the controller 300 may select numbers, which corresponds to the third sub region (S23) adjacent to the outside of the second sub region (S22), as the character type that can be input. As a result, referring to the center of FIG. 9C, numbers corresponding to the third sub region (S23) may be corresponded to the second sub region (S22) adjacent to the inside of the third sub region (S23), alphabet capital letters corresponding to the second sub region (S22) may be corresponded to the first sub region (S21) adjacent to the inside of the second sub region (S22), and alphabet small letters corresponding to the first sub region (S21) may be corresponded to the third sub region (S23) placed in the most outside. The passenger may visually recognize the change and thus the passenger may confirm that the character type that can be selected is changed from alphabet capital letters to numbers.

Once again, when the touch input sensors 100 and 200 detects the pinch out gesture from a passenger, the controller 300 may select alphabet small letters, which corresponds to the third sub region (S23) adjacent to the inside of the second sub region (S22), as the character type that can be input. As a result, referring to the right side of FIG. 9C, alphabet small letters corresponding to the third sub region (S23) may be corresponded to the second sub region (S22) adjacent to the inside of the third sub region (S23), numbers corresponding to the second sub region (S22) may be corresponded to the first sub region (S21) adjacent to the inside of the second sub region (S22), and alphabet capital letters corresponding to the first sub region (S21) may be corresponded to the third sub region (S23) placed in the most outside. The passenger may visually recognize the change and thus the passenger may confirm that the character type that can be selected is changed from numbers to alphabet small letters.

When the touch input sensors 100 and 200 detects the pinch in gesture from a passenger, the controller 300 may select numbers, which corresponds to the first sub region (S21) adjacent to the inside of the second sub region (S22), as the character type that can be input. As a result, referring to the center of FIG. 9C again, numbers corresponding to the first sub region (S21) may be corresponded to the second sub region (S22) adjacent to the outside of the first sub region (S21), alphabet small letters corresponding to the second sub region (S22) may be corresponded to the third sub region (S23) adjacent to the outside of the second sub region (S22), and alphabet capital letters corresponding to the third sub region (S23) may be corresponded to the first sub region (S21) placed in the most inside. The passenger may visually recognize the change and thus the passenger may confirm that the character type that can be selected is changed from alphabet small letters to numbers.

At last, when the touch input sensors 100 and 200 detects the pinch in gesture from a passenger, the controller 300 may select alphabet capital letters, which corresponds to the first sub region (S21) adjacent to the inside of the second sub region (S22), as the character type that can be input. As a result, referring to the left side of FIG. 9C again, alphabet capital letters corresponding to the first sub region (S21) may be corresponded to the second sub region (S22) adjacent to the outside of the first sub region (S21), numbers corresponding to the second sub region (S22) may be corresponded to the third sub region (S23) adjacent to the outside of the second sub region (S22), and alphabet small letters corresponding to the third sub region (S23) may be corresponded to the first sub region (S21) placed in the most inside. The passenger may visually recognize the change and thus the passenger may confirm that the character type that can be selected is changed from numbers to alphabet capital letters.

Figure 10:
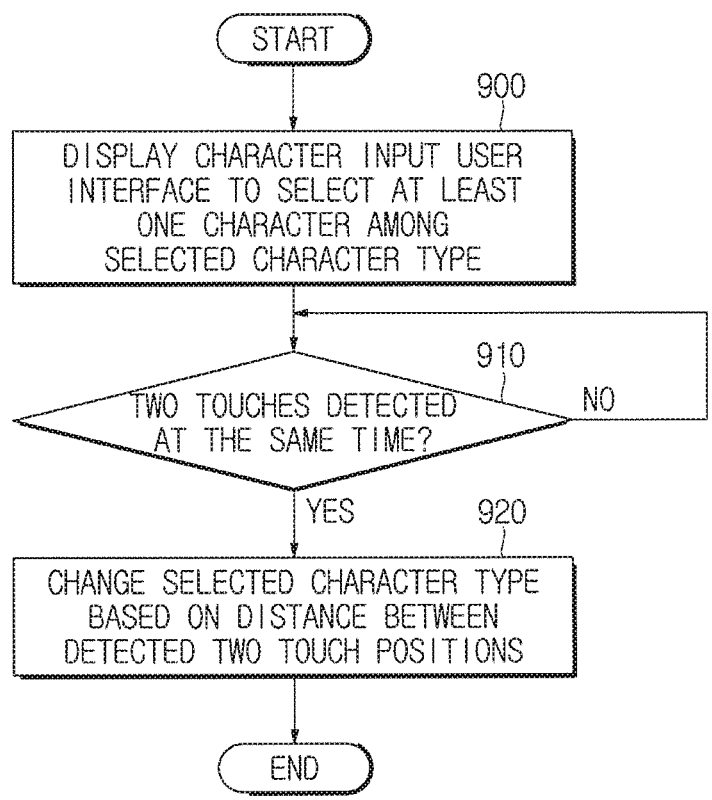
FIG. 10 is a flow chart illustrating a control method of the vehicle in accordance with one embodiment.

FIG. 10 is a flow chart illustrating a control method of the vehicle in accordance with one embodiment.

The vehicle may display the character input user interface to select at least one character among selected character type (900). In this time, the displayed character input user interface may include the character input object (I2) to receive a character and the input character display object (I1) in which a selected character is displayed. The character input object (I2) may include a first region (S1) formed to be a circular shape in the center of thereof to allow an input character to be placed and a second region (S2) configured to form a plurality of layers in an edge of the first region (S1) to select the character type.

In this time, each of the plurality of layers of the second region (S2) may correspond to a different character type.

The vehicle may confirm whether two touches are simultaneously detected (910). When the two touches are not detected, the vehicle may repeatedly confirm whether two touches are simultaneously detected.

When the two touches are simultaneously detected, the vehicle may change the selected character type based on a distance between the detected two touch positions (920). For example, when the distance between the detected two touch positions is increased, a selection may be changed to the character type corresponding to a layer adjacent to the inside of the selected layer of the second region (S2). In addition, when the distance between the detected two touch positions is reduced, a selection may be changed to the character type corresponding to a layer adjacent to the outside of the selected layer of the second region (S2).

As is apparent from the above description, according to the proposed touch input sensor and the control method of the same, it may be possible to provide an environment in which the character types can be easily changed while a driver is driving. Accordingly, it may be possible to enhance the driving stability by increasing a front-observing rate of the driver.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a display configured to display a character input user interface to select at least one character among a selected character type;
a touch input sensor configured to detect a touch; and
a controller configured to change the selected character type based on a distance between two touch positions which are detected at the same time,
wherein the character input user interface comprises a first region and a second region forming a plurality of layers in an edge of the first region,
wherein, when the distance between the two touch positions detected is decreasing, the controller changes the selected character type to a character type corresponding to a layer adjacent to an outer side of a currently selected layer among the plurality of layers,
wherein, when the distance between the two touch positions detected is increasing, the controller changes the selected character type to a character type corresponding to a layer adjacent to an inner side of the currently selected layer among the plurality of layers, and
wherein, when the selected character type is changed from a first character type corresponding to a first sub region in an innermost layer among the plurality of layers of the second region to a second character type corresponding to a second sub region adjacent to an outer side of the first sub region, a position of the first sub region is changed to a position in an inner side of the first region.

2. The vehicle of claim 1, wherein
in the second region, each of the plurality of layers corresponds to a different character type.

3. The vehicle of claim 2, wherein
when the first character type is selected while the distance between the two touch positions detected is decreasing, the controller selects the second character type.

4. The vehicle of claim 3, wherein
when the second character type is selected while the distance between the two touch positions detected is increasing, the controller selects the first character type corresponding to the first sub region placed inside of the first region.

5. The vehicle of claim 4, wherein
when the selected character type is changed from the second character type to the first character type, the first sub region located inside the first region moves to between the outer side of the first region and the second sub region.

6. The vehicle of claim 3, wherein
when the second character type is selected while the distance between the two touch positions detected at the same time is increasing, the controller selects the first character type corresponding to the first sub region adjacent to an inner side of the second sub region.

7. The vehicle of claim 2, wherein
the display displays an area of a layer corresponding to the selected character type by increasing the area thereof.

8. The vehicle of claim 2, wherein
the display displays the corresponding character type on each of the plurality of layers at the same time.

9. The vehicle of claim 1, wherein
the touch input sensor comprises a concave region for detecting a touch.

10. A control method of a vehicle, the method comprising:
displaying, by a display, a character input user interface to select at least one character among a selected character type;
detecting, by a touch input sensor, a touch; and
changing, by a controller, the selected character type based on a distance between two touch positions which are detected at the same time,
wherein, when the distance between the two touch positions detected is decreasing, the selected character type is changed to a character type corresponding to a layer adjacent to an outer side of a selected layer,
when the distance between the two touch positions detected is increasing, the selected character type is changed to a character type corresponding to a layer adjacent to an inner side of the selected layer,
wherein the character input user interface comprises a first region and a second region that forms a plurality of layers in an edge of the first region,
wherein the displaying the character input user interface further comprises, when the selected character type is changed from a first character type to a second character type, moving a first sub region to an inner side of the first region, and
wherein the first character type corresponds to a first sub region in an innermost layer among the plurality of layers and the second character type corresponds to a second sub region adjacent to an outer side of the first sub region.

11. The control method of claim 10, wherein
in the second region, each of the plurality of layers corresponds to a different character type.

12. The control method of claim 11, wherein
when the first character type is selected while the distance between the two touch positions detected is decreasing, the changing the selected character type selects the second character type.

13. The control method of claim 12, wherein
when the second character type is selected while the distance between the two touch positions detected at the same time is increasing, the changing the selected character type selects the first character type corresponding to the first sub region placed inside the first region.

14. The control method of claim 13, wherein
the displaying the character input user interface further comprises moving the first sub region located inside the first region to between the outer side of the first region and the second sub region, when the selected character type is changed from the second character type to the first character type.

15. The control method of claim 12, wherein
when the second character type is selected while the distance between the two touch positions detected at the same time is increasing, the changing the selected character type selects the first character type corresponding to the first sub region adjacent to an inner side of the second sub region.

16. The control method of claim 11, wherein
the displaying the character input user interface face displays an area of a layer corresponding to the selected character type by increasing the area thereof.

17. The control method of claim 11, wherein
the displaying the character input user interface face displays the corresponding character type on each of the plurality of layers at the same time.

18. The control method of claim 10, wherein
the detecting a touch detects the touch in a concave region provided in the touch input sensor of the vehicle.

* * * * *